US012088010B2

(12) United States Patent
Matsumoto et al.

(10) Patent No.: US 12,088,010 B2
(45) Date of Patent: Sep. 10, 2024

(54) ANTENNA DEVICE

(71) Applicant: DENSO CORPORATION, Kariya (JP)

(72) Inventors: Sho Matsumoto, Kariya (JP); Jungaun Lee, Kariya (JP); Youichi Hayase, Kariya (JP); Ryu Atsuta, Kariya (JP)

(73) Assignee: DENSO CORPORATION, Kariya (JP)

( * ) Notice: Subject to any disclaimer, the term of this patent is extended or adjusted under 35 U.S.C. 154(b) by 158 days.

(21) Appl. No.: 17/679,351

(22) Filed: Feb. 24, 2022

(65) Prior Publication Data

US 2022/0311147 A1 Sep. 29, 2022

(30) Foreign Application Priority Data

Mar. 24, 2021 (JP) ................................ 2021-050376

(51) Int. Cl.
*H01Q 19/10* (2006.01)
*H01Q 9/04* (2006.01)

(52) U.S. Cl.
CPC ........... *H01Q 19/10* (2013.01); *H01Q 9/0421* (2013.01)

(58) Field of Classification Search
CPC .... H01Q 19/10; H01Q 9/0421; H01Q 1/2291; H01Q 1/528; H01Q 1/38
See application file for complete search history.

(56) References Cited

U.S. PATENT DOCUMENTS

2014/0242903 A1* 8/2014 DeLuis .................. H01Q 1/521
343/893
2019/0273311 A1* 9/2019 Sampo ................... H01Q 21/29

FOREIGN PATENT DOCUMENTS

JP 2013-192073 A 9/2013
JP 2014-107746 A 6/2014

* cited by examiner

*Primary Examiner* — Hai V Tran
*Assistant Examiner* — Michael M Bouizza
(74) *Attorney, Agent, or Firm* — Posz Law Group, PLC

(57) ABSTRACT

An antenna is disposed, as a part of a conductor, on a substrate. The antenna includes a main plate providing a ground potential; and a patch portion arranged to face the main plate in Z direction. The substrate has a no-arrange region in which no conductor is arranged as a region between a periphery and the main plate in a plan view. A metal support portion of a case is in contact with the no-arrange region on a bottom surface of the substrate. The metal member is in contact with the no-arrange region on a top surface or on a bottom surface opposite to the top surface in the plate thickness direction of the substrate.

15 Claims, 10 Drawing Sheets

MAXIMUM GAIN -3.5 dBi

ANTENNA DEVICE

CROSS REFERENCE TO RELATED APPLICATION

The present application is based on and claims the benefit of priority of Japanese Patent Application No. 2021-050376, filed on Mar. 24, 2021, the disclosure of which is incorporated herein by reference.

TECHNICAL FIELD

The present disclosure generally relates to an antenna device.

BACKGROUND INFORMATION

A comparative example discloses an antenna device in which an antenna including a patch portion and a main plate is formed on a substrate. The comparative example is Japanese Unexamined Patent Publication No. 2014-107746, and is incorporated herein by reference as an explanation of some of the technical elements in the present disclosure.

SUMMARY

It is an object of the present disclosure to provide an antenna device capable of suppressing deterioration of antenna characteristics.

In one embodiment, the substrate has a no-arrange region in which the main plate serves as an edge portion of the conductor. Then, the metal member is in contact with the no-arrange region on one surface or the back surface of the substrate. The metal member reflects radio waves radiated from the patch portion. In such manner, it is possible to prevent the radio waves radiated from the patch portion from leaking below the main plate through the no-arrange region existing on the outside of the main plate. As a result, deterioration of antenna characteristics is suppressible.

The objects, features, and advantages disclosed in the specification become apparent by referring to following detailed descriptions and accompanying drawings.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
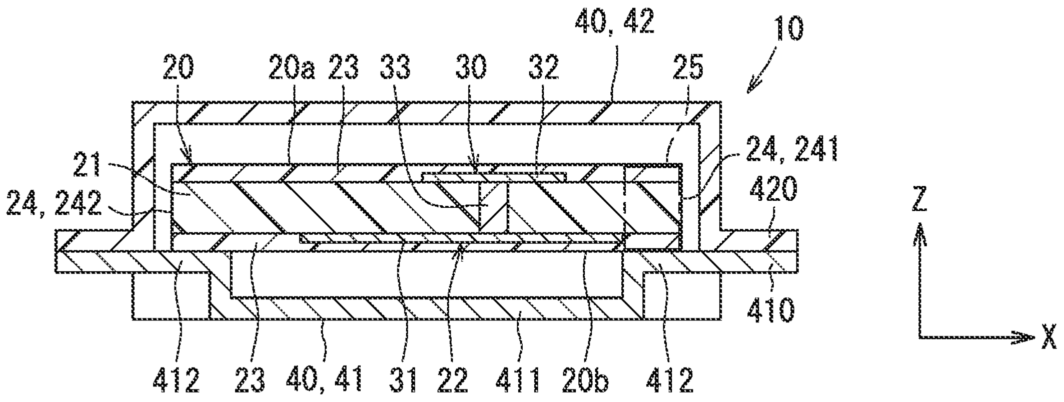
FIG. 1 is a cross-sectional view showing an antenna device according to a first embodiment.

Hereinafter, multiple embodiments are described with reference to the drawings. The same reference numerals are assigned to the corresponding elements in each embodiment, and thus, duplicate descriptions may be omitted. In each of the embodiments, when only a part of the configuration is described, the other parts of the configuration may be applied to the other embodiments. Further, not only the combinations of the configurations explicitly shown in the description of the respective embodiments, but also the configurations of the multiple embodiments can be at least partially combined even when they are not explicitly so described as long as there is no difficulty in the combination in particular.

First Embodiment

An antenna device according to the present embodiment transmits and/or receives radio waves of a predetermined operating frequency. The antenna device is configured to be able to transmit and/or receive radio waves in a frequency band used in, for example, short-range wireless communication. The operating frequency in the present embodiment is 2.44 GHz. The operating frequency may be appropriately designed and may be another frequency (for example, 5 GHz).

<Basic Structure of Antenna Device>

Figure 2:
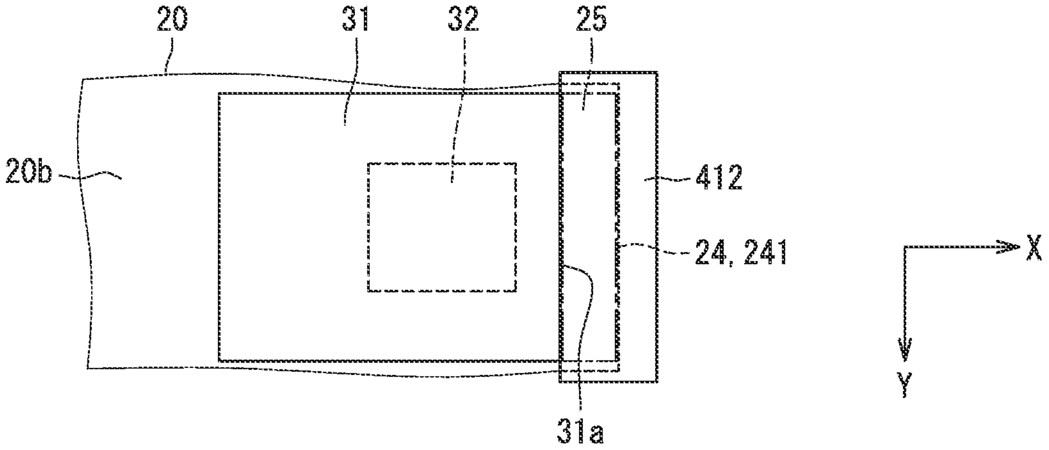
FIG. 2 is a plan view showing a positional relationship between a no-arrange region and a support portion.

First, the basic structure of the antenna device is described with reference to FIGS. 1 and 2. FIG. 1 is a cross-sectional view showing the antenna device of the present embodiment. FIG. 2 is a plan view of a substrate as viewed from a back surface side (also known as from a bottom surface side). In FIG. 2, a support portion is also shown in order to show the positional relationship between a no-arrange region of the substrate and the support portion of a housing. In FIG. 2, for convenience, a protective film on the substrate is omitted from illustration.

As shown in FIGS. 1 and 2, an antenna device 10 includes a substrate 20, an antenna 30, and a housing 40. In the following, a plate thickness direction of the substrate 20 is defined as a Z direction, and one direction orthogonal to the Z direction is defined as an X direction. A direction orthogonal to both of the Z direction and the X direction is defined as a Y direction. Unless otherwise specified, a shape viewed in a plane (i.e., a plan view) from the Z direction, that is, a shape along an XY plane defined by the X and Y directions is referred to as a planar shape. The plan view from the Z direction may be simply referred to as a plan view. In the cross sectional view shown in FIG. 1, standard semiconductor device terminology may be used: top, bottom, left, and right as shown in FIG. 1. For example, the Z direction is vertical (up and down), and the positive Z direction is upwards. The positive X direction is rightwards.

The substrate 20 has a base member 21 and a conductor 22. The substrate 20 may be referred to as a printed circuit board or a wiring board. The substrate 20 includes a top surface 20*a* and a bottom surface 20*b* as a surface opposite to the top surface 20*a* in the Z-direction. The base member 21 contains a dielectric material such as a resin. With the base member 21, the wavelength shortening effect of the dielectric can be expected. As the base member 21, for example, a material made of only a resin, a combination of a resin and a glass cloth, a non-woven fabric, or the like, a material containing ceramic, or the like are adoptable. The base member 21 may be configured to include only one insulating layer containing a dielectric, or may be configured by laminating the insulating layer in multiple layers. The base member 21 corresponds to an insulating base member.

A conductor 22 is arranged on the base member 21. The conductor 22 is formed on a printed circuit board by using a general wiring technique. The conductor 22 includes a conductor pattern and a via conductor. The conductor pattern may also be referred to as a conductor layer. The conductor pattern is arranged in multiple layers on or in the base member 21. That is, the substrate 20 is a multilayer substrate. The conductor pattern is formed by patterning a metal foil such as a copper foil. The via conductor is formed by arranging a conductor such as plating in a through hole (via) formed in the insulating layer constituting the base member 21.

The substrate 20 has a protective film 23 on each of the top surface 20*a* and the bottom surface 20*b*. The protective film 23 may also be referred to as a resist. An example of the protective film 23 is a photoresist. Of the conductors 22 arranged on the surface layer, the portion excluding an electrical connection portion with the outside such as a pad is covered with the protective film 23.

The substrate 20 may have a substantially rectangular shape in a plane. The substrate 20 has a periphery 24 that defines an outer contour of the substrate 20 in a plan view. The periphery 24 is a side surface of the substrate 20 that connects the top surface 20*a* and the bottom surface 20*b*. The substrate 20 has, as the periphery 24, a first periphery 241 and a second periphery 242 opposite to the first periphery 241 in the X direction. The first periphery edge 241 and the second periphery edge 242 are a part of the periphery 24, and may be referred to as an edge portion of the substrate 20. The substrate 20 has a no-arrange region 25 between the first periphery edge 241 and a main plate 31. The no-arrange region 25 is described later.

The antenna 30 has the main plate 31, a patch portion 32, and a short-circuit portion 33. Each element constituting the antenna 30 is arranged on the base member 21 as a part of the conductor 22. The antenna 30 may be configured by using part of the conductor 22. That is, the antenna 30 is formed on the substrate 20. The substrate 20 may include only the components of the antenna 30 as the conductor 22, or may further include circuit elements other than the components of the antenna 30.

The main plate 31 provides a ground potential of the antenna 30. The main plate 31 is a conductor made of copper or the like. The direction perpendicular to the plate surface of the main plate 31 is substantially parallel to the Z direction. In a plan view, an area size of the main plate 31 is larger than an area size of the patch portion 32. The main plate 31 has a size that includes/encompasses the entire patch portion 32. The main plate 31 preferably has a size necessary for the antenna 30 to operate stably. The main plate 31 is connected to a power supply circuit (not shown) to provide a ground potential.

The main plate 31 of the present embodiment has a substantially rectangular plane shape with the X direction as a longitudinal direction and the Y direction as a lateral direction. Each side of the main plate 31 has a length of, for example, one or more wavelengths of the radio wave of the operating frequency, that is, at least one wavelength or more. The main plate 31 is arranged on the bottom surface 20*b* of the substrate 20. The main plate 31 is formed by patterning a metal foil, for example, a copper foil, which is arranged on the surface of the base member 21. The main plate 31 is at least a part of the conductor pattern arranged on the surface layer on a bottom surface 20*b* side of the substrate 20. The main plate 31 is covered with the protective film 23.

The planar shape of the main plate 31 can be changed as appropriate. In the present embodiment, the planar shape of the main plate 31 is a rectangle as an example, but as another example, it may be square or polygon. It may also have a circular shape. The circular shape may be a perfect circle or an ellipse. The main plate 31 is preferably formed to have a diameter larger than a circle having one wavelength. The main plate 31 is not limited to a surface layer arrangement on the bottom surface 20*b* side of the substrate. For example, it may be arranged inside the substrate 20 as a part of an inner layer conductor.

The patch portion 32 is a conductor made of copper or the like. The patch portion 32 is a conductor arranged to face the main plate 31 to have a predetermined distance from the main plate 31 in the Z direction. The patch portion 32 may also be referred to as a radiating element. In a plan view, the entire patch portion 32 overlaps with the main plate 31. That is, the entire area of the surface (i.e., a lower surface) of the patch portion 32 faces the main plate 31 in the Z direction. The patch portion 32 is arranged substantially parallel to the main plate 31. Substantially parallel is not limited to perfect parallelism. For example, the patch portion 40 may be tilted by several degrees to ten degrees with respect to the main plate 31.

The patch portion 32 of the present embodiment is at least a part of the conductor pattern arranged on the surface layer on a top surface 20*a* side of the substrate 20. The patch portion 32 is formed by patterning a metal foil arranged on the surface of the base member 21. The patch portion 32 is covered with the protective film 23. The basic shape of the patch portion 32 is a substantially square plane shape. The basic shape is the outer contour of the patch portion 32 in a plan view. The patch portion 32 may have a slit that opens in the outer contour. For example, it may be possible to employ a patch portion 32 having a substantially H-shaped plane shape, in which two slits are provided in a substantially square plane. The patch portion 32 is not limited to the surface layer arrangement on the top surface 20*a*. For example, it may be arranged inside the substrate 20 as a part of an inner layer conductor.

By arranging the patch portion 32 to face the main plate 31, a capacitor is formed according to the area size of the patch portion 32 and the distance from the main plate 31.

The patch portion 32 has a size that forms a capacitor that resonates in parallel with an inductor included in the short-circuit portion 33 at a target frequency. The area size of the patch portion 32 is appropriately designed to provide the desired capacitor and thus to operate at the desired operating frequency.

In the present embodiment, the basic shape (i.e., outer contour) of the patch portion 32 is square as an example, but as another configuration, the planar shape of the patch portion 32 may be circular, regular octagon, regular hexagon, or the like. The basic shape of the patch portion 32 is preferably a line-symmetrical shape with each of the two straight lines orthogonal to each other as the axis of symmetry, that is, a bidirectional line-symmetrical shape. The bidirectional line symmetrical shape refers to a figure that is line-symmetric with a first straight line as an axis of symmetry, and that is also line-symmetric with respect to a second straight line that is orthogonal to the first straight line. The bidirectional line symmetrical shape corresponds to, for example, an ellipse, a rectangle, a circle, a square, a regular hexagon, a regular octagon, a rhombus, or the like. Further, the patch portion 32 is more preferably a point-symmetrical figure such as a circle, a square, a rectangle, or a parallelogram.

The patch portion 32 is connected to the power supply circuit via a power supply line (not shown). The power supply line may be configured to include a conductor pattern arranged on the same surface as the patch portion 32, or may be configured to include a via conductor. The electric current input from the power supply circuit to the power supply line propagates to the patch section 32 and excites the patch section 32. Note that the power supply method is not limited to a direct power supply method. A power supply method in which the power supply line and the patch portion 32 are electromagnetically coupled may also be adopted.

The short-circuit portion 33 electrically connects the main plate 31 and the patch portion 32, that is, short-circuits the two. The short-circuit portion 33 is a columnar conductor having one end connected to the main plate 31 and the other end connected to the patch portion 32. The short-circuit portion 33 has, for example, a substantially circular plane shape. By adjusting the diameter and length of the short-circuit portion 33, an inductance provided in the short-circuit portion 33 can be adjusted. The short-circuit portion 33 is connected to a substantial center of the patch portion 32 in a plan view. The center of the patch portion 32 corresponds to the center of gravity of the patch portion 32.

Since the patch portion 32 of the present embodiment has a planar square shape, the center corresponds to the intersection of the two diagonal lines of the patch portion 32. The short-circuit portion 33 is a via conductor arranged in the through hole of the base member 21. The number of via conductors constituting the short-circuit portion 33 is not particularly limited. The short-circuit portion 33 may be formed by a plurality of via conductors arranged in parallel between the main plate 31 and the patch portion 32.

Note that a communication cable such as a coaxial cable or a feeder line may be used to connect the antenna 30 to the power supply circuit (e.g., a wireless communication circuit). The power supply circuit may be mounted on the substrate 20. In such case, the power supply line can also be provided as the conductor 22.

The housing 40 houses and protects other elements of the antenna device 10. A part of the housing 40 is formed by using a metal material. The other part of the housing 40 is formed by using a resin material in order to radiate a radio wave to an outside of the housing 40 from the patch portion 32 and/or receive a radio wave from the outside of the housing 40.

In the present embodiment, the housing 40 includes two members divided in the Z direction, specifically, a case 41 and a cover 42. The case 41 is formed using a metal material. The cover 42 is formed by using a resin material. The housing 40 is formed by assembling the case 41 and the cover 42 along the Z direction. The method of assembling the case 41 and the cover 42 is not particularly limited. Assembling methods such as screw fastening or adhesion can be used.

The case 41 has a box shape with one side open in the Z direction. The case 41 has a flange portion 410 surrounding the opening. A bottom wall portion 411 of the case 41 has, for example, a substantially rectangular planar shape. The case 41 has a support portion 412 that protrudes in the Z direction from a part of the bottom wall portion 411. The support portion 412 supports the bottom surface 20*b* of the substrate 20 to fix the substrate 20 in the housing 40. The substrate 20 is fixed to the case 41 in a state of being supported by the support portion 412. The case 41 has a plurality of support portions 412. The plurality of support portions 412 are dispersedly arranged in the case 41. In the present embodiment, the support portion 412 is connected to the flange portion 410, but the support portion 412 may be provided at a position away from the flange portion 410. For example, the height of the protrusions of the support portion 412 may be lower than that shown in FIG. 1, and at least a part of the substrate 20 may be arranged in (i.e., sunk in) the case 41 in the Z direction, such that the substrate 20 substantially is enclosed (in all but the top side) by the case 41 (not shown). In FIG. 1, the substrate 20 is substantially enclosed (in all but the bottom side) by the cover 42.

The cover 42 also has a box shape with one side open in the Z direction. The cover 42 has a flange portion 420 surrounding the opening. The case 41 and the cover 42 are positioned and assembled so that the flange portions 410 and 420 overlap each other.

<Antenna Operation>

Next, the operation of the antenna 30 is described. As described above, the antenna 30 has a structure in which the main plate 31 and the patch portion 32 facing each other are connected by the short-circuit portion 33. Such a structure is a so-called mushroom structure, which is the same as a basic structure of metamaterials. Since the antenna 30 is an antenna to which the metamaterial technology is applied, it may sometimes be called a metamaterial antenna.

Since the antenna 30 of the present embodiment is designed to operate in the 0th-order resonance mode at a desired operating frequency, it may be referred to as a 0th-order resonance antenna. Among the dispersion characteristics of metamaterials, a phenomenon of resonance at a frequency at which a phase constant $\beta$ becomes zero (0) is the 0th-order resonance. The phase constant $\beta$ is an imaginary part of a propagation coefficient $\gamma$ of a wave propagating on a transmission line. The antenna 30 can satisfactorily transmit and/or receive radio waves in a predetermined band including a frequency at which 0th-order resonance occurs.

The antenna 30 is generally operated by LC parallel resonance between a capacitor (formed between the main plate 31 and the patch portion 32) and an inductor included in the short-circuit portion 33. The patch portion 32 is short-circuited to the main plate 31 by a short-circuit portion 33 provided in the central region thereof. Further, the area size of the patch portion 32 is an area size for forming a capacitor that resonates in parallel with the inductor included in the short-circuit portion 33 at a desired frequency (i.e., operating frequency). Note that the value of the inductor (i.e., inductance) is determined according to the dimensions of each part of the short-circuited portion 33, for example, the diameter and the length in the Z direction.

Therefore, when electric power of the operating frequency is supplied, parallel resonance occurs due to energy exchange between the inductor and the capacitor, and an electric field perpendicular to the main plate 31 is generated between the main plate 31 and the patch portion 32. That is, an electric field in the Z direction is generated. This vertical electric field propagates from the short-circuit portion 33 toward the periphery portion of the patch portion 32, becomes vertically polarized at the periphery portion of the patch portion 32, and propagates in space. Note that the vertically polarized wave here refers to a radio wave in which the vibration direction of the electric field is perpendicular to the main plate 31 and the patch portion 32. Further, the antenna 30 receives vertically polarized waves arriving from the outside of the antenna device 10 by LC parallel resonance.

Note that the resonance frequency of the 0th-order resonance does not depend on the antenna size. Therefore, the length of one side of the patch portion 32 can be made shorter than the ½ wavelength of the 0th-order resonance frequency. For example, even if one side has a length equivalent to a one-quarter wavelength, 0th-order resonance can be generated. For example, when the operating frequency is 2.44 GHZ, the wavelength λε can be obtained as a square root (300 [mm/s]/2.44 [GHz])/the dielectric constant of the substrate 20 in the configuration including the substrate 20. It is possible to make one side shorter than a one-quarter wavelength. However, for instance, the gain such as antenna gain is reduced in such case.

<No-Arrange Region and Metal Members>

Next, based on FIGS. 1 and 2, the no-arrange region 25 of the substrate 20, the support portion 412 of the case 41 which is a metal member, and their positional relationship are described.

The antenna 30 of the present embodiment is provided in the vicinity of the periphery 24 of the substrate 20 in the X direction, specifically, in the vicinity of the first periphery edge 241. The patch portion 32 is arranged between the first periphery edge 241 and the second periphery edge 242, and is arranged close to the first periphery edge 241. That is, the patch portion 32 is unevenly arranged toward the first periphery edge 241 side in the X direction. The first periphery edge 241 is a side closest to the antenna 30 among the four sides (i.e., edges) of the periphery 24 of the substrate 20. In a plan view, the distance between the outer contour of the main plate 31 and the outer contour of the patch portion 32 is the shortest on the first periphery edge 241 side with respect to the patch portion 32. The antenna 30 may have such a biased arrangement in consideration of other circuit elements formed on the substrate 20, electronic components mounted on the substrate 20, and the like.

The no-arrange region 25 is a region extending from the periphery 24 to the main plate 31 on the substrate 20, and is a region in which the conductor 22 is not arranged. The substrate 20 of the present embodiment has the no-arrange region 25 at a position between a side 31*a* of the main plate 31 and the first periphery edge 241. The side 31*a* is one of the four sides (i.e., edges) forming the outer contour of the main plate 31 in a plan view, and is a side facing the first periphery edge 241. The sides 31*a* are substantially parallel to the Y direction. The no-arrange region 25 is a region between the side 31*a* of the main plate 31 and the first periphery edge 241. The side 31*a* of the main plate 31 substantially coincides with the edge of a formable region of the conductor 22 on the substrate 20. That is, the no-arrange region 25 of the present embodiment is a region in which the conductor 22 is not arranged so as not to overlap with a cut portion where the mother substrate is cut for taking a large number of substrates 20.

One of the support portions 412 is in contact with the no-arrange region 25 on the bottom surface 20*b* of the substrate 20. The support portion 412 is adjacent to (vertically aligned with) the side 31*a* of the main plate 31 without a gap in a plan view. The support portion 412 is adjacent to the side 31*a* without a gap entirely in the total length of the side 31*a* along the Y direction. That is, the support portion 412 overlaps with the entire area of the no-arrange region 25 in a plan view. The length of the support portion 412 in the Y direction is set to be slightly longer than that of the no-arrange region 25, and the support portion 412 straddles (i.e., covers/encompasses) the no-arrange region 25 in the Y direction. One of the support portions 412, and thus the case 41, corresponds to a metal member provided separately from the conductor 22.

<Directivity and Antenna Gain>

Figure 3:
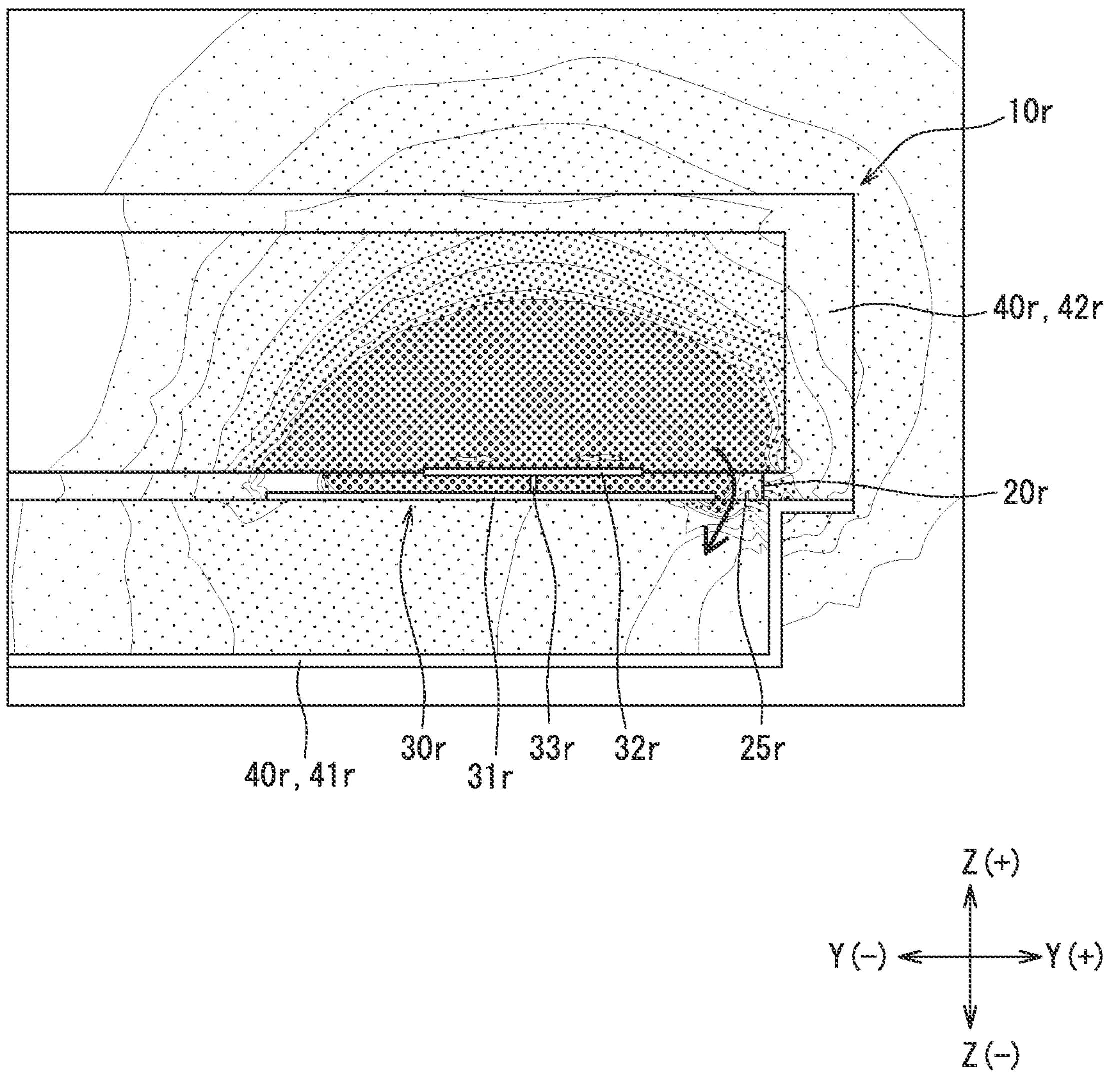
FIG. 3 is a diagram showing radiation characteristics of a reference example.
Figure 4:
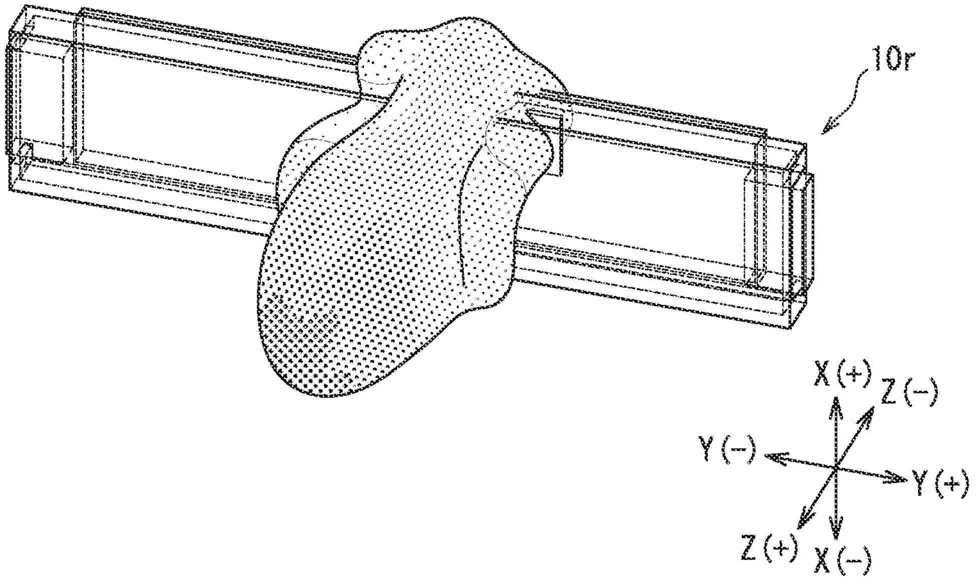
FIG. 4 is a diagram showing radiation characteristics of the reference example.
Figure 5:
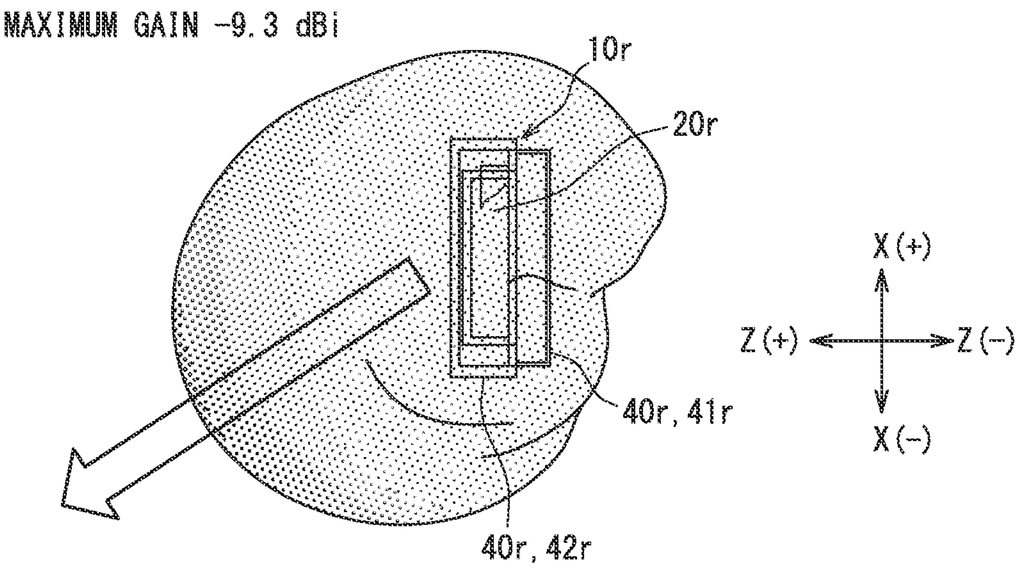
FIG. 5 is a diagram showing radiation characteristics of a 0th-order resonant antenna according to the reference example.
Figure 6:
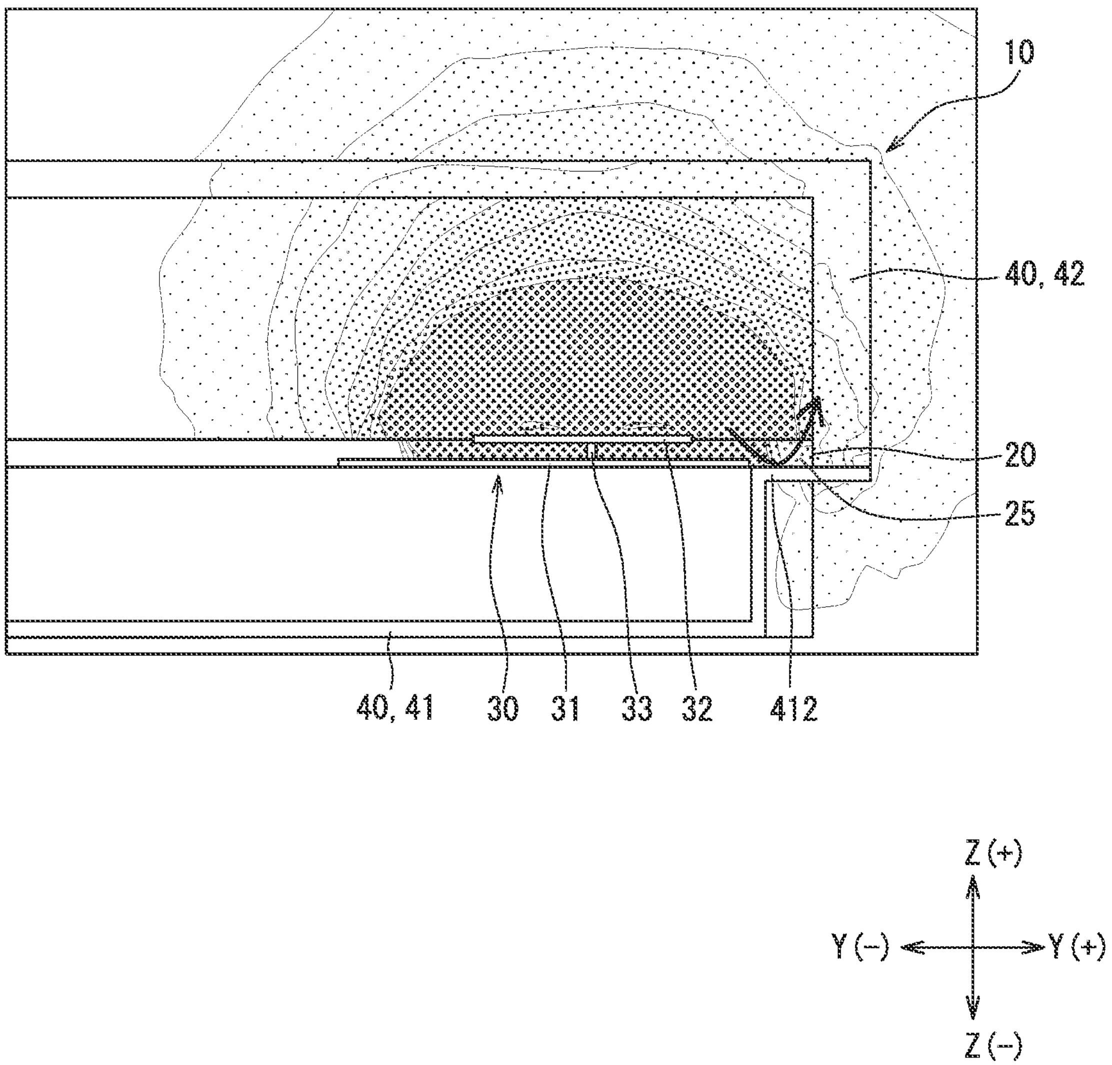
FIG. 6 is a diagram showing radiation characteristics.
Figure 7:
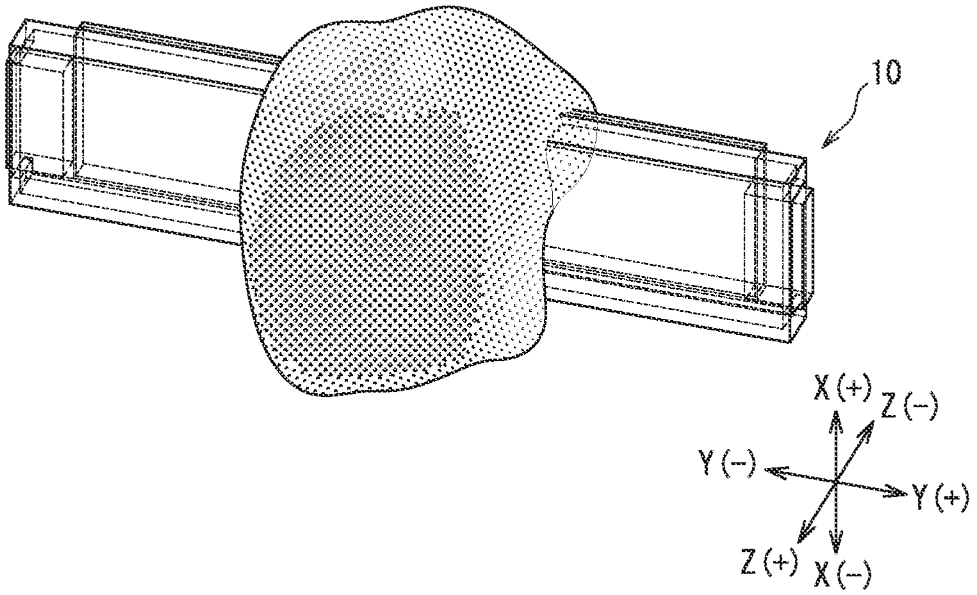
FIG. 7 is a diagram showing radiation characteristics.
Figure 8:
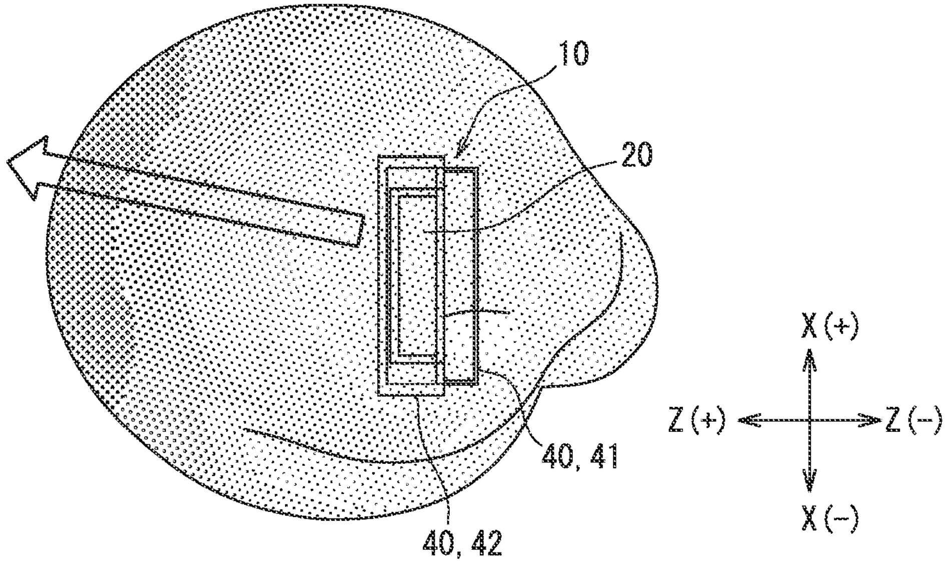
FIG. 8 is a diagram showing radiation characteristics.

The results of evaluating this example and a reference example by electromagnetic field simulation are shown below. FIG. 3, FIG. 4, and FIG. 5 show the simulation results (i.e., radiation characteristics) of the reference example. FIG. 6, FIG. 7, and FIG. 8 show the simulation results (i.e., radiation characteristics) of this example. FIGS. 3 and 6, FIGS. 4 and 7, and FIGS. 5 and 8 correspond to each other. FIGS. 3 to 8 show a plus (+) direction and a minus (−) direction regarding each of the X direction, the Y direction, and the Z direction. Strictly speaking, FIGS. 1 and 2 show, with its legend, the X (+) direction, the Y (+) direction, and the Z (+) direction. This example shows an example of the antenna device 10 according to the present embodiment. In the reference example, reference codes/numerals of the element that is the same as or related to the element of the present embodiment is assumed to have r added to the end of the code/numeral of the present embodiment.

This example includes a metal support portion 412 that contacts the no-arrange region 25. On the other hand, the reference example does not have a support portion that contacts the no-arrange region 25. The conditions of this example and the reference example are the same except for the presence or absence of the support portion (i.e., metal member). The operating frequency is 2.44 GHz. The antennas 30 and 30*r* have the same configuration as each other, and are arranged in the vicinity of the first periphery edges 241 and 241*r* of the substrates 20 and 20*r*. That is, the no-arrange regions 25 and 25*r* are provided at a position between the main plates 31, 31*r* and the first periphery edges 241 and 241*r*, respectively.

In the reference example, as shown in FIG. 3, the electric field extends in the Z (−) direction through the no-arrange region 25*r* of the substrate 20*r*. That is, radio wave radiated from the patch portion 32*r* leaks below the main plate 31*r* through the no-arrange region 25*r* existing outside the main plate 31*r*. In such manner, the radiant power leaks below the main plate 31*r*. A curved arrow shown in FIG. 3 indicates a leak of radio waves (i.e., electric power). Since the radiant power leaks below the main plate 31*r* through the no-arrange region 25*r*, the directivity is inclined toward the X (−) direction with respect to the Z (+) direction as shown in FIGS. 4 and 5. The arrows shown in FIG. 5 indicate directivity. The maximum gain is −9.3 dBi.

In this example, as shown in FIG. 6, since the support portion 412 is in contact with the no-arrange region 25, radio wave radiated from the patch portion 32 is reflected by the support portion 412 as shown by the curved arrow. As a result, the spread of the electric field in the Z (−) direction through the no-arrange region 25 is suppressed. That is, the leakage of radiant power below the main plate 31 is suppressed. As shown in FIGS. 7 and 8, the directivity is inclined in the X (+) direction with respect to the Z (+) direction because the electric power leaking downward is suppressible. The arrow shown in FIG. 8 indicates directivity. The maximum gain is −3.5 dBi.

Summary of First Embodiment

Figure 9:
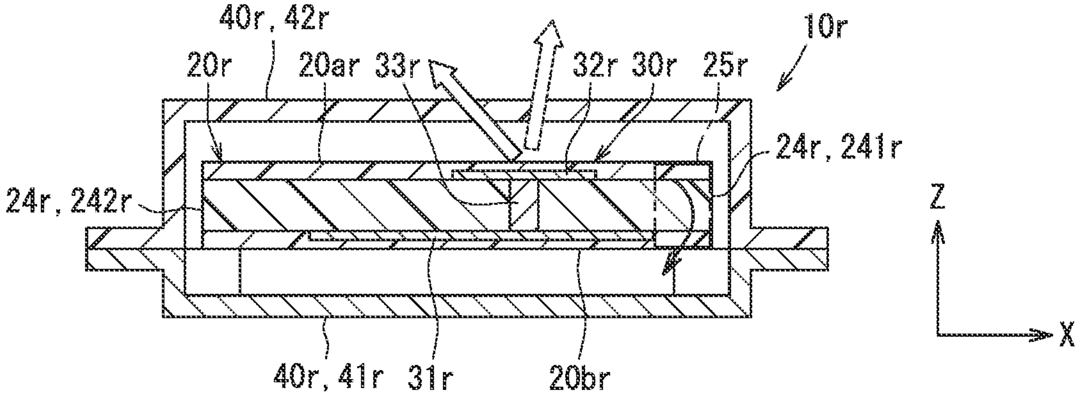
FIG. 9 is a cross-sectional view showing an antenna device of the reference example.

FIG. 9 is a cross-sectional view showing the antenna device 10*r* of the reference example. FIG. 9 corresponds to FIG. 1. The solid line white arrow shown in FIG. 9 indicates directivity of the antenna 30*r*. As described above, in the reference example, the metal member is not in contact with the no-arrange region 25*r* between the main plate 31*r* and the first periphery edge 241*r*. Therefore, as shown by the solid line arrow, a radio wave (i.e., electric power) radiated from the patch portion 32*r* leaks below the main plate 31*r* through the no-arrange region 25*r*. As a result, the electric field is unintentionally biased, and directivity is deviated from the aiming direction of directivity indicated by a broken line white arrow. The maximum gain is also low as shown in the simulation results. As described above, if the radio wave leaks below the main plate 31*r* through the no-arrange region 25*r*, the antenna characteristics such as the antenna gain and directivity are deteriorated.

Figure 10:
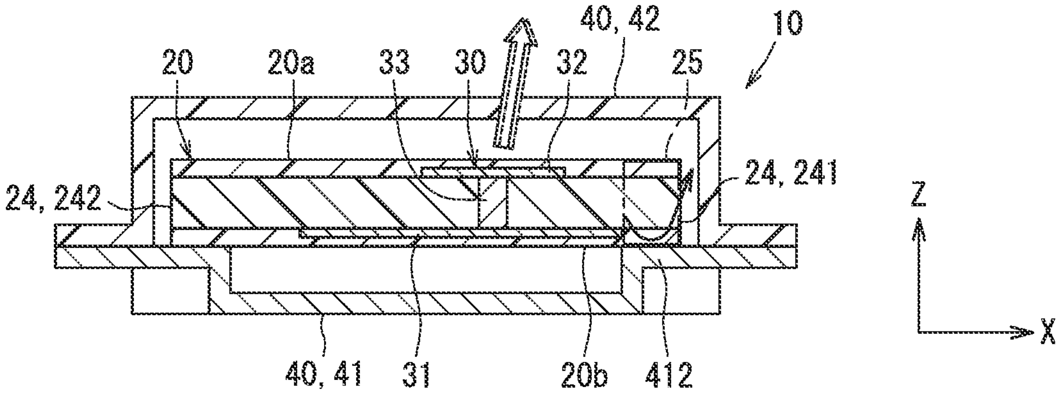
FIG. 10 is a cross-sectional view showing an effect of a support portion.

FIG. 10 is a diagram showing the effect of the support portion 412 in the antenna device 10 of the present embodiment. FIG. 10 corresponds to FIG. 1. A solid line white arrow shown in FIG. 10 indicates directivity of the antenna 30. A broken line white arrow indicates the aiming direction of the directivity as in FIG. 9. In the present embodiment, on the bottom surface 20*b* of the substrate 20, the support portion 412 of the case 41 is in contact with the no-arrange region 25 between the main plate 31 and the first periphery edge 241. Therefore, as shown by the solid line arrow, radio wave radiated from the patch portion 32 is reflected by the support portion 412. That is, it is possible to prevent the radiated radio waves (i.e., electric power) from leaking below the main plate 31 through the no-arrange region 25 existing outside the main plate 31. As a result, the unintentional biasing of the electric field is alleviated (reduced), and the directivity can be obtained in the target direction indicated by the white arrow indicated by the broken line. Further, the maximum gain is improved as shown in the simulation results. As described above, according to the present embodiment, deterioration of antenna characteristics such as antenna gain and directivity is suppressible.

In the first embodiment (FIGS. 1-3 and 10), the support portion 412 is adjacent to the side 31*a* of the main plate 31 without a gap in a plan view. Therefore, it is possible to effectively suppress the leakage of radio waves from the gap between the main plate 31 and the support portion 412. As a result, deterioration of the antenna characteristics can be effectively suppressed.

In the first embodiment, the support portion 412 is in contact with the bottom surface 20*b* and overlaps with the entire no-arrange region 25 in a plan view. That is, it covers the entire no-arrange region 25 in a plan view. In such manner, since the propagation path of the radio wave through the no-arrange region 25 is completely blocked by the support portion 412, it is possible to more effectively suppress the leakage of the radio wave.

In the present embodiment, one of the support portions 412 of the case 41 constituting the housing 40 is intentionally provided at a position in contact with the no-arrange region 25 on the bottom surface 20*b*. As a result, one of the support portions 412 supports the substrate 20 and suppresses leakage of radio waves through the no-arrange region 25. As described above, deterioration of the antenna characteristics is suppressible with such a simple configuration.

Modified Examples

Figure 11:
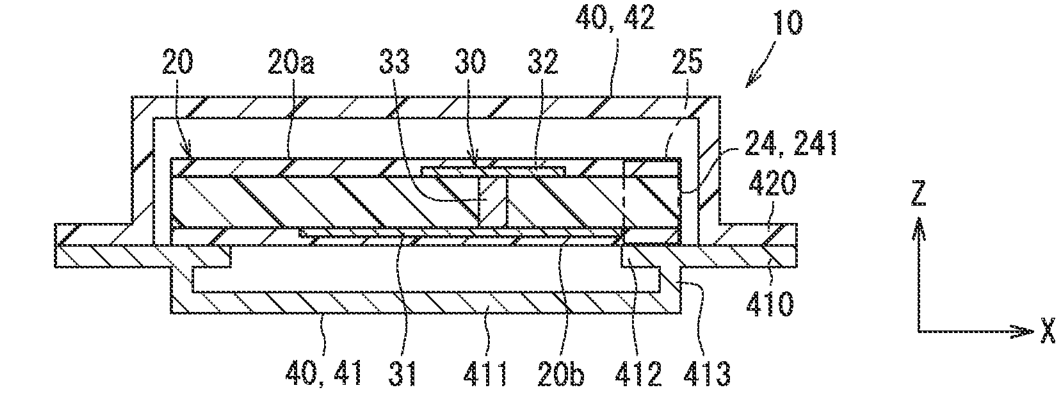
FIG. 11 is a cross-sectional view showing a modified example.

The configuration in which a part of the case 41 is brought into contact with the no-arrange region 25 on the bottom surface 20*b* is not limited to the above example. For example, a configuration shown in FIG. 11 may be adopted. FIG. 11 is a cross-sectional view showing a modified example of the antenna device 10, and corresponds to FIG. 1. In the modified example, the flange portion 410 extends outward with respect to the side wall portion 413 of the case 41, and the support portion 412 extends on the opposite side of the flange portion 410, that is, inward. The side wall portion 413 is a wall portion that connects the bottom wall portion 411 and the flange portion 410. The case 41 has a plurality of support portions 412. Then, one of the plurality of support portions 412 is in contact with the no-arrange region 25. Therefore, deterioration of the antenna characteristics is suppressible in the same manner as in the configurations shown in FIGS. 1 and 2. Although not shown, the flange portion 410 may also serve as the support portion 412. That is, the no-arrange region 25 of the substrate 20 may be sandwiched between the flange portions 410 and 420.

Figure 12:
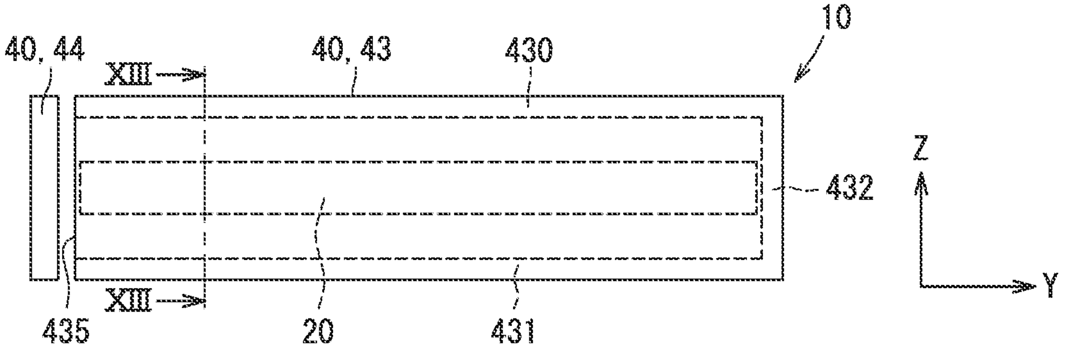
FIG. 12 is a side view showing another modified example.
Figure 13:
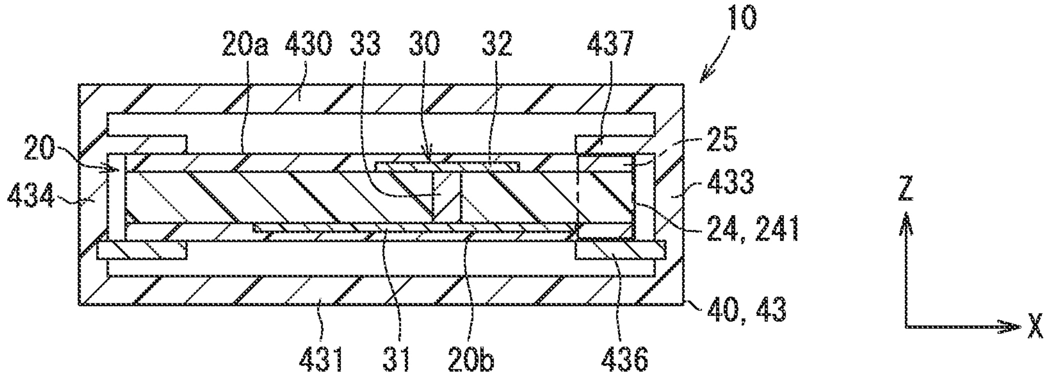
FIG. 13 is a cross-sectional view taken along the line XIII-XIII of FIG. 12.

The housing 40 is not limited to a configuration that can be divided in the Z direction. For example, configurations shown in FIGS. 12 and 13 may be adopted. FIG. 12 is a side view showing another modified example of the antenna device 10. FIG. 13 is a cross-sectional view taken along a XIII-XIII line of FIG. 12. In FIG. 12, in order to make it easy to distinguish a main body portion 43 and a lid portion 44, they are intentionally separated from each other in the drawing. In this modified example, a so-called bag-structured housing 40 is adopted. The housing 40 includes the main body portion 43 and the lid portion 44. The main body portion 43 has an upper wall portion 430 and a bottom wall portion 431, which are wall portions in the Z direction, and side wall portions 432, 433, and 434. The main body portion 43 has an opening 435 at an edge opposite to the side wall portion 432 in the Y direction, which is one of the side wall portions. The lid portion 44 is attached to the main body portion 43 to close the opening 435 of the main body portion 43.

As shown in FIG. 13, the main body portion 43 has guide portions 436 and 437 for guiding the substrate 20 to the back side of the main body portion 43, that is, toward the side wall portion 432. The guide portions 436 and 437 are provided in pairs. The guide portions 436 and 437 project inward from an inner wall of the side wall portions 433 and 434. The paired guide portions 436 are provided at substantially the same positions in the Z direction on each of the side wall portions 433 and 434 arranged in the X direction. The guide portion 436 is integrally formed with the main body portion 43 by molding the main body portion 43 using a metal piece as an insert component. The paired guide portions 437 are provided at substantially the same positions in the Z direction on each of the side wall portions 433 and 434 arranged in the X direction. The guide portion 437 is disposed to provide a distance slightly longer than the thickness of the substrate 20 as to a distance to the guide portion 436. The guide portion 437 is formed by using a resin material. The guide portion 437 is integrally molded using the same material as the main body portion 43, for example, when the main body portion 43 is molded.

In the above configuration, the metal guide portion 436 is in contact with the no-arrange region 25 on the bottom surface 20*b* of the substrate 20. Therefore, deterioration of the antenna characteristics is suppressible in the same manner as in the configurations shown in FIGS. 1 and 2. In this modified example, the main body portion 43 has the metal guide portion 436 and the resin guide portion 437. However, the main body portion 43 may have only the metal guide portion 436. The guide portion 436 corresponds to a metal member.

Figure 14:
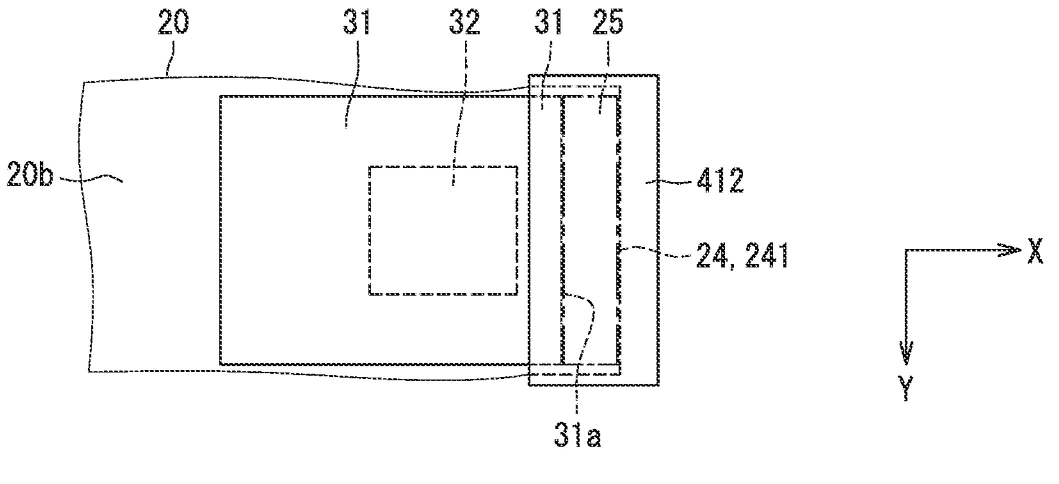
FIG. 14 is a plan view showing another modified example.

An example is shown in which the support portion 412 (i.e., a metal member) is adjacent to the main plate 31 without a gap in a plan view. However, the present disclosure is not limited to such configuration. For example, the configuration shown in FIG. 14 may be adopted. FIG. 14 is a diagram showing another modified example of the antenna device 10, and corresponds to FIG. 2. FIG. 14 shows the positional relationship between the no-arrange region 25 of the substrate 20 and the support portion 412. Also in FIG. 14, for convenience, the protective film 23 is omitted from illustration. In this modified example, the support portion 412 is arranged to overlap with the main plate 31 in a plan view. According to this, even if the positions of the case 41 and the substrate 20 vary within the manufacturing tolerance during assembly, a gap is unlikely to occur between the main plate 31 and the support portion 412. Therefore, the deterioration of the antenna characteristics can be effectively suppressed.

Further, in the example shown in FIG. 14, the support portion 412 overlaps with the entire area of the no-arrange region 25 in a plan view, and also overlaps with the portion of the main plate 31 in a predetermined range in the X direction from the side 31*a*. The support portion 412 straddles a part of the main plate 31 in the Y direction in a plan view. According to this, even if the positions of the case 41 and the substrate 20 vary as described above, it is possible to completely block the propagation path of the radio wave through the no-arrange region 25.

Second Embodiment

The second embodiment is a modified example of a preceding embodiment as a basic configuration and may incorporate description of the preceding embodiment. In the preceding embodiment, the metal member was brought into contact with the no-arrange region on the back surface of the substrate. Alternatively, the metal member may be brought into contact with the no-arrange region on the back surface and may be electrically connected to the main plate.

Figure 15:
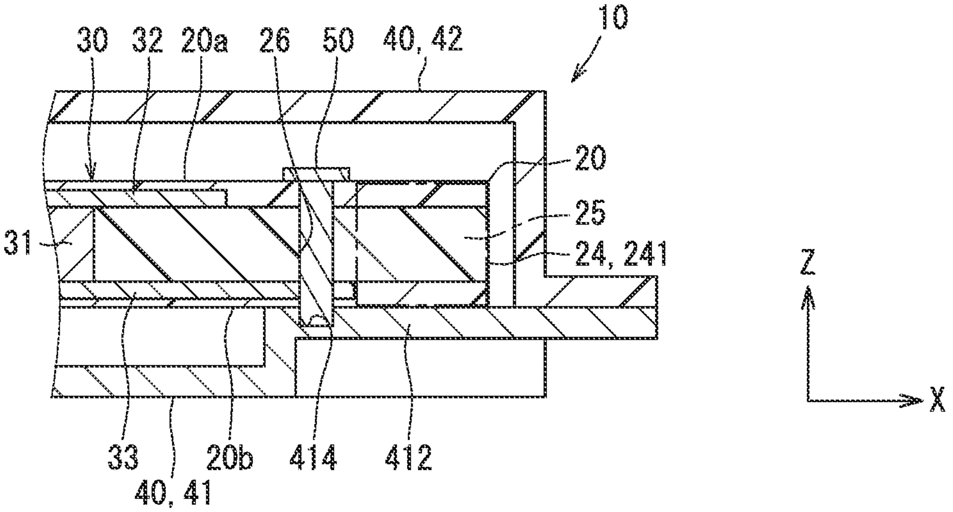
FIG. 15 is an enlarged cross-sectional view of a periphery of the no-arrange region in the antenna device of the second embodiment.

FIG. 15 is a cross-sectional view showing the antenna device 10 according to the present embodiment. In FIG. 15, a periphery of the no-arrange region 25 of the antenna device 10 is enlarged and shown. In the present embodiment, the substrate 20 is fixed to the support portion 412 of the case 41 by a fastening member 50. The substrate 20 is fixed to the support portion 412 by the fastening member 50 in a state of being supported by the support portion 412. The fastening member 50 is formed by using a metal material. The fastening member 50 is, for example, a bolt or a screw.

The substrate 20 has a through hole 26 penetrating the substrate 20 from the top surface 20*a* to the bottom surface 20*b*. The through hole 26 is provided at a position where it does not overlap with the patch portion 32 and overlaps with the main plate 31 in a plan view. As shown in FIG. 14, the support portion 412 is arranged to overlap with a part of the main plate 31 in a plan view. The case 41 has a hole 414 formed in the support portion 412. The hole 414 may be a non-penetrating hole or a through hole. In case that the hole 414 is a non-penetrating hole, a portion for fixing the fastening member 50, for example, a female screw portion or a nut portion is formed in the hole 414. In case that the hole 414 is a through hole, a nut or the like is arranged outside the case 41. The hole 414 is provided at a position overlapping with the through hole 26 in a plan view.

Summary of Second Embodiment

According to the present embodiment, in the fixed state, the fastening member 50 comes into contact with the main plate 31 forming a part of the wall surface of the through hole 26. Further, the fastening member 50 comes into contact with the support portion 412 forming a wall surface of the hole 414. That is, the support portion 412, and thus the case 41, is electrically connected to the main plate 31 via the fastening member 50. In such manner, the case 41 has the same potential (i.e., ground potential) as the main plate 31, and functions as the main plate 31. Since the main plate 31 expands, the antenna gain can be improved.

Modified Examples

The configuration for electrically connecting the case 41 and the main plate 31 is not limited to the above example. For example, the protective film 23 on the bottom surface 20*b* may be locally removed to expose a part of the main plate 31 on the bottom surface 20*b*. In such case, the case 41 can be electrically connected to the exposed portion of the main plate 31 (not shown).

Third Embodiment

The third embodiment is a modified example of a preceding embodiment as a basic configuration and may incorporate description of the preceding embodiment. In the preceding embodiments, the metal member was brought into contact with the no-arrange region on the back surface of the substrate. Alternatively, the metal member may be brought into contact with the no-arrange region on the top surface 20*a* of the substrate.

Figure 16:
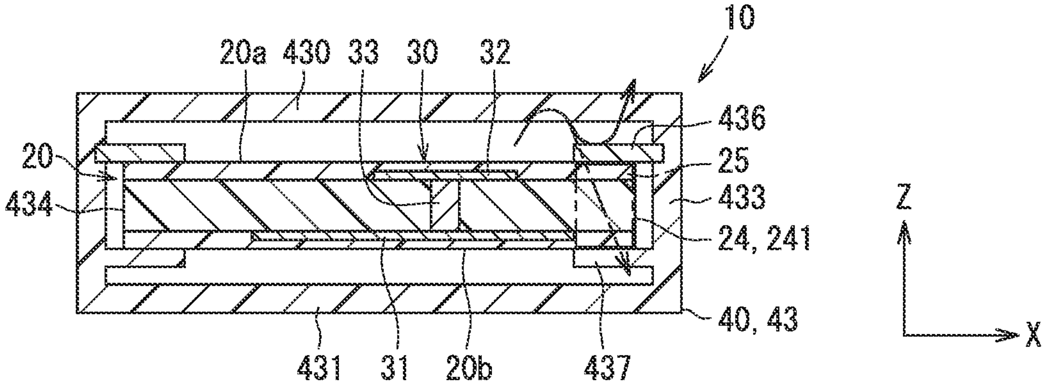
FIG. 16 is a cross-sectional view showing an antenna device of a third embodiment.
Figure 17:
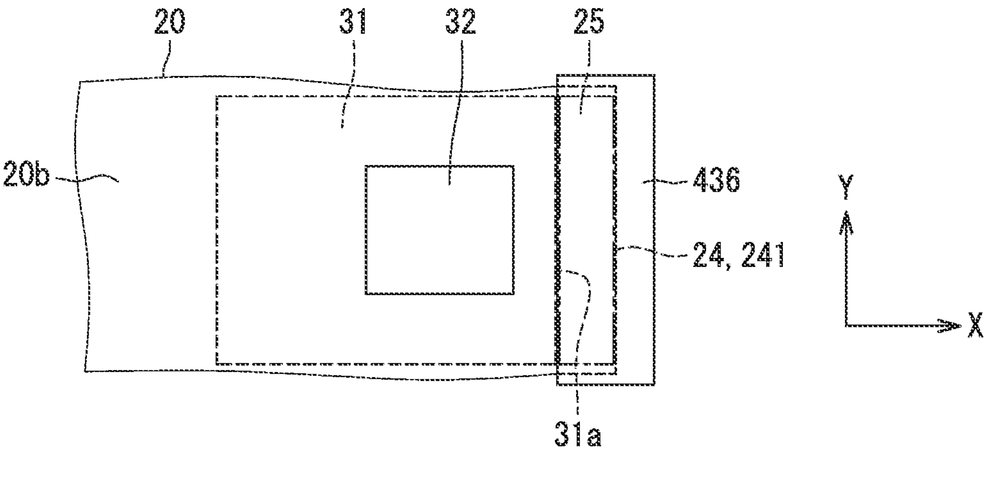
FIG. 17 is a plan view showing a positional relationship between a no-arrange region and a guide portion.

FIG. 16 is a cross-sectional view showing the antenna device 10 according to the present embodiment. FIG. 16 corresponds to FIG. 13. FIG. 17 is a plan view of the substrate 20 as viewed from a top surface 20*a* side in the antenna device 10 shown in FIG. 16. In FIG. 17, the guide portion 436 is also shown in order to show the positional relationship between the no-arrange region 25 and the guide portion 436. In FIG. 17, the protective film 23 is omitted from illustration for convenience.

As shown in FIG. 16, the antenna device 10 of the present embodiment has substantially the same structure as the antenna device 10 shown in FIG. 13. In the present embodiment, the guide portions 436 and 437 are arranged in the reverse manner to the configuration shown in FIG. 13. That is, the metal guide portion 436 is provided on a top surface 20*a* side of the substrate 20, and the resin guide portion 437 is provided on a bottom surface 20*b* side thereof. The guide portion 436 is in contact with the no-arrange region 25 on the top surface 20*a* of the substrate 20. Like the support portion 412 shown in the first embodiment, the guide portion 436 is adjacent to the side 31*a* of the main plate 31 without a gap in a plan view. The guide portion 436 is adjacent to the side 31*a* without a gap entirely in the total length of the side 31*a* along the Y direction. The support portion 412 overlaps with the entire no-arrange region 25 in a plan view. Other configurations are the same as those shown in FIGS. 12 and 13.

Summary of Third Embodiment

When the guide portion 436 does not exist, radio wave (i.e., electric power) radiated by the patch portion 32 leaks below the main plate 31 through the no-arrange region 25, as shown by an arrow of two-dot chain line in FIG. 16. According to the present embodiment, the metal guide portion 436 is in contact with the no-arrange region 25 on the top surface 20*a*. Therefore, as shown by a solid line arrow, radio wave radiated from the patch portion 32 can be reflected by the guide portion 436. That is, it is possible to prevent the radiated radio waves (i.e., electric power) from leaking below the main plate 31 through the no-arrange region 25 existing outside the main plate 31. As a result, deterioration of antenna characteristics such as antenna gain and directivity is suppressible as in the configuration in which the metal member contacts the no-arrange region 25 on the bottom surface 20*b*.

Modified Examples

In FIGS. 16 and 17, as an example, the guide portion 436 is adjacent to the main plate 31 without a gap. However, the present disclosure is not limited to such configuration. For example, as in the example shown in FIG. 14, the guide portion 436 may be arranged to overlap with the main plate 31. Further, both of the guide portions 436 and 437 may be made of metal.

Figure 18:
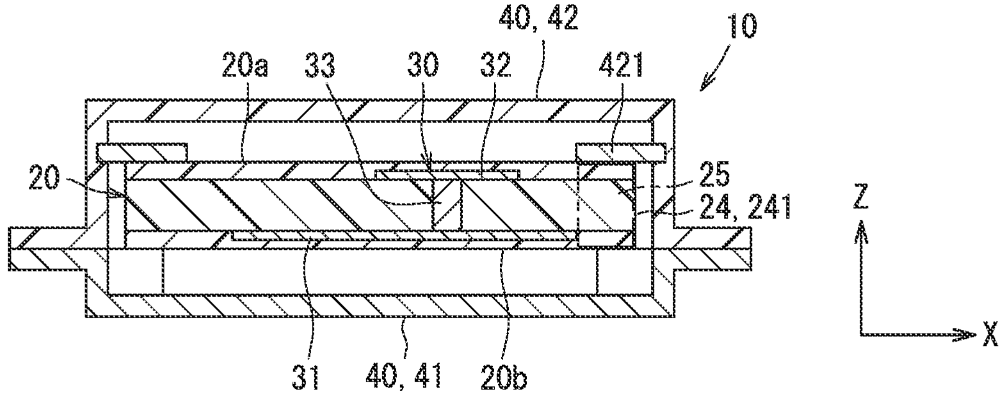
FIG. 18 is a cross-sectional view showing yet another modified example.

An example of the guide portion 436 is shown as a metal member in contact with the top surface 20*a*, but the present disclosure is not limited to such configuration. That is, the guide portion is not limited to the metal member having a guide function. For example, an example shown in FIG. 18 may be adopted. FIG. 18 is a cross-sectional view showing a modified example of the antenna device 10, and corresponds to FIG. 1. In this modified example, a metal piece 421 is integrated with the cover 42. The metal piece 421 is integrally formed with the cover 42, for example, as an insert component. When assembling the case 41 and the cover 42, the metal piece 421 comes into contact with the no-arrange region 25 on the top surface 20*a* of the substrate 20. Therefore, the same effects as that of the guide portion 436 shown in FIG. 16 can be obtained. The metal piece 421 corresponds to a metal member.

Fourth Embodiment

The fourth embodiment is a modified example of a preceding embodiment as a basic configuration and may incorporate description of the preceding embodiment. In the preceding embodiment, the metal member is arranged to be adjacent to or overlap with the main plate without any gap. Alternatively, a gap may be provided between the metal member and the main plate.

Figure 19:
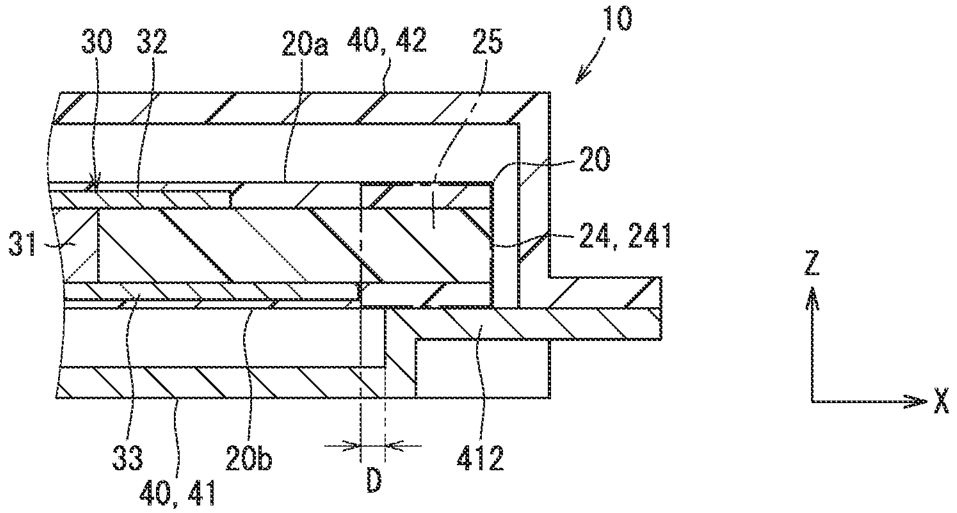
FIG. 19 is an enlarged cross-sectional view of the periphery of a no-arrange region in the antenna device according to a fourth embodiment.
Figure 20:
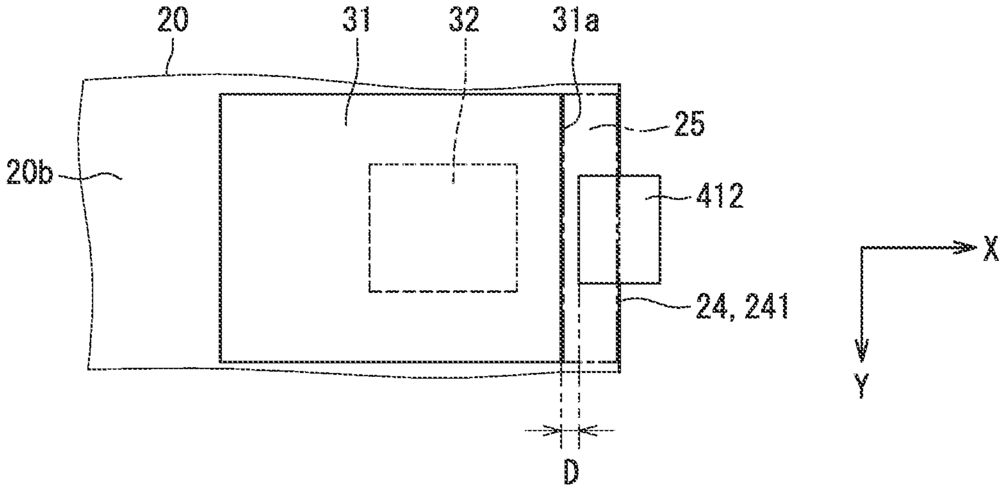
FIG. 20 is a plan view showing a positional relationship between a no-arrange region and a support portion.

FIG. 19 is an enlarged cross-sectional view of the periphery of the no-arrange region 25 in the antenna device 10 according to the present embodiment. FIG. 20 is a plan view showing the positional relationship between the main plate 31 and the support portion 412 in the antenna device 10 shown in FIG. 19. FIG. 20 corresponds to FIG. 2. In FIG. 20, for convenience, the protective film 23 is not shown for convenience.

In the present embodiment, as in the first embodiment, one of the support portions 412 of the case 41 is in contact with the no-arrange region 25 on the bottom surface 20*b* of the substrate 20. The support portion 412 has a gap of a distance D between the support portion 412 and the main plate 31, specifically, the side 31*a* of the main plate 31. The distance D is the longest distance between the main plate 31 and the support portion 412 in the plan view. The support portion 412 is in contact with only a part of the no-arrange region 25 in the X direction. The support portion 412 is shorter than the no-arrange region 25 in the Y direction. The support portion 412 is in contact with only a part of the no-arrange region 25 in the Y direction.

As an example, in the present embodiment, assuming that the wavelength of radio wave at the operating frequency of the antenna 30 is λ, the support portion 412 may be arranged to satisfy $D \leq \lambda \times 1/4$. The wavelength λ is the above-mentioned wavelength λε. Other configurations are the same as those described in the preceding embodiments.

Summary of Fourth Embodiment

In the present embodiment, the support portion 412 is arranged with a gap between the support portion 412 and the main plate 31. The support portion 412 (i.e., case 41), which is a metal member, is in contact with only a part of the no-arrange region 25. The support portion 412 reflects a part of, but not a small part of or substantial part of, in other words, radio waves (i.e., electric power) that may otherwise leak below the main plate 31 through the no-arrange region 25. Therefore, deterioration of the antenna characteristics is suppressible as compared with the configuration in which the support portion 412 does not contact the no-arrange region 25.

An example is shown in the above, in which the support portion 412 contacts a part of the no-arrange region 25 on the bottom surface 20*b*. However, the present disclosure is not limited to such. A metal member provided separately from the conductor 22 may be in contact with at least a part of the no-arrange region 25 on the top surface 20*a* or the bottom surface 20*b* of the substrate 20. As long as the metal member is in contact with at least a part of the no-arrange region 25, the metal member can reflect radio waves (i.e., electric power) that may leak below the main plate 31 through the no-arrange region 25. In such manner, deterioration of the antenna characteristics is suppressible as compared with the configuration in which the metal member does not come into contact with the no-arrange region 25.

In the present embodiment, the support portion 412 is arranged so that the gap distance D satisfies $D \leq \lambda \times 1/4$. As a result, even if there is a gap between the main plate 31 and the support portion 412 (i.e., a metal member) in a plan view, the gap is sufficiently small with respect to the wavelength. Therefore, it is possible to suppress the leakage of radio waves from the gap.

Fifth Embodiment

The fifth embodiment is a modified example of a preceding embodiment as a basic configuration and may incorporate description of the preceding embodiment. In the preceding embodiment, the substrate had one no-arrange region. Alternatively, the substrate may have a plurality of no-arrange regions.

Figure 21:
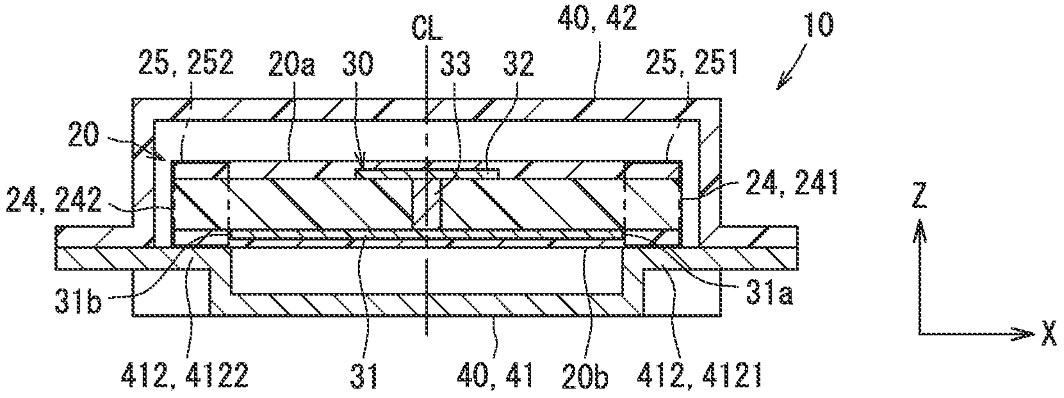
FIG. 21 is a cross-sectional view showing an antenna device according to a fifth embodiment.

FIG. 21 is a cross-sectional view showing the antenna device 10 according to the present embodiment. FIG. 21 corresponds to FIG. 1. In FIG. 21, a virtual line that bisects the substrate 20 in the X direction, that is, a center line CL is shown by a two-dot chain line.

As shown in FIG. 21, the antennas 30 are arranged line-symmetrically in the X direction. The antenna 30 is arranged symmetrically with respect to the center line CL. In the X direction, the center of the main plate 31 overlaps with the center line CL. In the X direction, the center of the patch portion 32 overlaps with the center line CL. In the X direction, the center of the short-circuit portion 33 overlaps with the center line CL. The main plate 31 has a side 31*b* as one of the four sides. The side 31*b* is a side opposite to the side 31*a* in the X direction. The side 31*b* is a side facing the second periphery edge 242 of the substrate 20. The side 31*b* is substantially parallel to the Y direction. Like the side 31*a*, the side 31*b* of the main plate 31 substantially coincides with the edge of the formable region of the conductor 22 on the substrate 20.

The substrate 20 has two no-arrange regions 25. The substrate 20 is provided, as a no-arrange region 25, with a first no-arrange region 251 provided at a position between the main plate 31 and the first periphery edge 241 and a second no-arrange region 252 provided at a position between the main plate 31 and the second periphery edge 242. The first no-arrange region 251 corresponds to the no-arrange region 25 described in the preceding embodiment. The second no-arrange region 252 is a no-arrange region 25 opposite to the first no-arrange region 251 in the X direction. The X direction corresponds to a predetermined direction.

Further, the case 41 has a first support portion 4121 and a second support portion 4122 respectively as a part of the plurality of support portions 412. The first support portion 4121 is in contact with the first no-arrange region 251 on the bottom surface 20*b* of the substrate 20. The second support portion 4122 is also in contact with the second no-arrange region 252 on the bottom surface 20*b*.

In FIG. 21, as in the first embodiment, the first support portion 4121 is adjacent to the side 31*a* of the main plate 31 without a gap in a plan view, and overlaps with the entire area of the first no-arrange region 251. Similarly, the second support portion 4122 is adjacent to the side 31*b* of the main plate 31 without a gap in a plan view and overlaps with the entire area of the second no-arrange region 252

Summary of the Fifth Embodiment

According to the present embodiment, the case 41, which is a metal member, is in contact with each of the first no-arrange region 251 and the second no-arrange region 252 on the bottom surface 20*b* of the substrate 20. Specifically, the first support portion 4121 of the case 41 is in contact with the first no-arrange region 251. Therefore, radio wave radiated from the patch portion 32 is reflected by the first support portion 4121. Therefore, it is possible to prevent the radiated radio waves (i.e., electric power) from leaking below the main plate 31 through the first no-arrange region 251 existing outside the main plate 31.

Further, the second support portion 4122 of the case 41 is in contact with the second no-arrange region 252. Therefore, radio wave radiated from the patch portion 32 is reflected by the second support portion 4122. Therefore, it is possible to prevent the radiated radio waves (i.e., electric power) from leaking below the main plate 31 through the second no-arrange region 252 existing outside the main plate 31. As described above, deterioration of the antenna characteristics can be effectively suppressed.

In the configuration having two no-arrange regions 25, the support portion 412 (i.e., metal member) may be brought into contact with only one no-arrange region 25. However, considering the balance of the electric field, it may be preferable to bring the support portion 412 into contact with each of the no-arrange regions 25.

The positional relationship between the main plate 31 and the support portion 412 is not limited to the example shown in FIG. 21. It is possible to make combination in various manners. That is, combination among each of the plural embodiments and modified examples may be made. Further, the number of no-arrange regions 25 is not limited to two. For example, the substrate 20 may have three no-arrange regions 25, and the metal member may come into contact with each of the no-arrange regions 25.

Other Embodiments

The disclosure in the present specification and drawings is not limited to the exemplified embodiments described so far. The disclosure includes exemplary embodiments and modified examples by those skilled in the art based on them. For example, the disclosure is not limited to the combinations of parts and/or element shown in the above embodiments. The disclosure can be carried out in various combinations. The disclosure can have additional portions that can be added to the embodiment. The disclosure includes those in which the parts and/or elements of the embodiment are omitted. The disclosure includes the reallocation or combination of parts and/or elements between one embodiment and another. The technical scope disclosed is not limited to the description of the embodiments. Some technical scopes disclosed are indicated by the claims and should be understood to include all modified examples within the meaning and scope equivalent to the claims.

The disclosure in the specification, drawings and the like is not limited by the description of the claims. The disclosures in the specification, the drawings, and the like encompass the technical ideas described in the claims, and further extend to a wider variety of technical ideas than those in the claims. Therefore, various technical ideas can be extracted from the disclosure of the specification, the drawings and the like without being limited to the description of the claims.

When an element or a layer is described as “disposed above” or “connected,” the element or the layer may be directly disposed above or connected to another element or another layer, or an intervening element or an intervening layer may be present therebetween. In contrast, when an element or a layer is described as “disposed directly above” or “directly connected”, an intervening element or an intervening layer is not present. Other terms used to describe the relationships between elements (for example, “between” vs. “directly between”, and “adjacent” vs. “directly adjacent”) should be interpreted similarly. As used herein, the term “and/or” includes any combination, and all combinations, with respect to one or more related listed items.

Spatial relative terms “inside”, “outside”, “back”, “bottom”, “low”, “top”, “high”, etc. are used herein to facilitate the description that describes relationships between one element or feature and another element or feature. Spatial relative terms can be intended to include different orientations of a device in use or operation, in addition to the orientations depicted in the drawings. For example, when the device in the figure is flipped over, an element described as “below” or “directly below” another element or feature is directed “above” the other element or feature. Therefore, the term “below” can include both above and below. The device may be oriented in the other direction (e.g., rotated 90 degrees or in any other direction) and the spatially relative terms used herein are interpreted accordingly.

An example of a 0th-order resonant antenna is shown as the antenna 30, but the antenna 30 is not limited to such. Nor is it limited to metamaterial antennas. For example, it can be applied to an antenna having a structure including a main plate 31 and a patch portion 32 and not having a short-circuit portion 33, that is, a so-called patch antenna.

An example is shown in which the no-arrange region 25 substantially coincides with the no-arrange region from which the conductor 22 is positioned away so as not to overlap with the cut portion at which the mother substrate is cut to take multiple pieces of the substrate 20. That is, an example is shown in which the sides 31*a* and 31*b* of the main plate 31 substantially coincide with the edge of the formable region of the conductor 22 on the substrate 20. However, the antenna device may have a configuration in which the edge portion (i.e., side) of the main plate 31 is provided inside the edge portion of the formable region of the conductor 22, and the no-arrange region where the conductor 22 is not arranged is located at a position between the main plate 31 and the periphery 24 in a plan view. Also in such case, by bringing the metal member into contact with the no-arrange region on the top surface 20*a* or the bottom surface 20*b* of the substrate 20, it is possible to suppress the leakage of radio waves (i.e., electric power) below the main plate 31 through the no-arrange region.

An example in which a part of the housing 40 serves as a metal member in contact with the no-arrange region 25 on the top surface 20*a* or the bottom surface 20*b* of the substrate 20 is shown. However, the present disclosure is not limited to such configuration. For example, a metal member that is interposed between the substrate 20 and the housing 40 for fixing the substrate 20 to the housing 40 may be brought into contact with the no-arrange region 25. Further, a part of a heat radiating member such as a heat sink housed in the housing may be brought into contact with the no-arrange region 25.

What is claimed is:

1. An antenna device comprising:
a substrate having an insulating base member and a conductor arranged on the insulating base member;
an antenna having:
a main plate arranged on the insulating base member as at least a part of the conductor and providing a ground potential;
a patch portion arranged to face the main plate in a plate thickness direction of the substrate; and
a metal member provided separately from the conductor, wherein
the substrate has a no-arrange region in which the conductor is not arranged, which is a region from a periphery of the substrate to the main plate in a plan view,
the metal member is in contact with the no-arrange region on a top surface or on a bottom surface opposite to the top surface in the plate thickness direction of the substrate, and
a housing is formed by using a resin material for radiating a radio wave and the metal member.

2. The antenna device of claim 1, wherein
the metal member is arranged to be adjacent to or overlap with the main plate without a gap in the plan view.

3. The antenna device of claim 2, wherein
the main plate is arranged on a surface layer on the bottom surface side of the substrate, and
the metal member is in contact with the no-arrange region on the bottom surface and is electrically connected to the main plate.

4. The antenna device of claim 1, wherein
assuming that a wavelength of radio wave at an operating frequency of the antenna is λ,
the metal member is positioned to reserve a gap of $\lambda \times 1/4$ or less from the main plate in the plan view.

5. The antenna device of claim 1, wherein
the substrate has a first periphery edge and a second periphery edge opposite to the first periphery edge in a predetermined direction,
the patch portion is arranged at a position between the first periphery edge and the second periphery edge and near the first periphery edge in the predetermined direction, and
the no-arrange region is provided at a position between the first periphery edge and the main plate.

6. The antenna device of claim 1, wherein
the substrate has, as a no-arrange region, a first no-arrange region and a second no-arrange region opposite to the first no-arrange region in a predetermined direction, and
the metal member is in contact with each of the first no-arrange region and the second no-arrange region.

7. The antenna device of claim 1, wherein
the substrate has at least one no-arrange region, and
the metal member overlaps with an entire area of at least one no-arrange region in the plan view.

8. The antenna device of claim 1, wherein
the antenna further includes a short-circuit portion that electrically connects the patch portion and the main plate.

9. The antenna device of claim 1, wherein
the metal member is a part of a housing for accommodating the substrate and the antenna.

10. The antenna device of claim 1, wherein
the conductor is arranged directly on the insulating base member.

11. The antenna device of claim 1, wherein
the patch portion is arranged on the insulating member, and
the insulating member is arranged between the main plate and the patch portion.

12. The antenna device of claim 1, wherein
the metal member is a first metal member arranged as a separate element from a second metal member that constitutes the antenna.

13. The antenna device of claim 12, wherein
the metal member of the housing is in contact with the no-arrange region.

14. The antenna device of claim 1, wherein
the no-arrange region and the metal member are positioned to overlap with each other in the plate thickness direction of the substrate, and the antenna does not overlap with the no-arrange region nor with the metal member in the plate thickness direction of the substrate.

15. The antenna device of claim 1, wherein the no-arrange region is a predetermined range from a periphery of the substrate, and the periphery is formed by cutting of the substrate from a patterned mother substrate.

* * * * *